(No Model.)

S. H. ATKINS.
HINGE.

No. 323,018. Patented July 28, 1885.

Witnesses.
Fred L. Emery.
John F. C. Prinkert.

Inventor
Sullivan H. Atkins.
By Crosby & Gregory
Attys

N. PETERS. Photo-Lithographer, Washington, D. C.

UNITED STATES PATENT OFFICE.

SULLIVAN H. ATKINS, OF LYNN, MASSACHUSETTS, ASSIGNOR TO THE EUREKA AXLE COMPANY OF PORTLAND, MAINE.

HINGE.

SPECIFICATION forming part of Letters Patent No. 323,018, dated July 28, 1885.

Application filed February 9, 1885. (No model.)

*To all whom it may concern:*

Be it known that I, SULLIVAN H. ATKINS, of Lynn, county of Essex, and State of Massachusetts, have invented an Improvement in Hinges, of which the following description, in connection with the accompanying drawings, is a specification, like letters on the drawings representing like parts.

My invention relates to a hinge-joint applicable to devices in which it is desired to give one member a pivotal or rotary movement with relation to another member, and to prevent looseness or lost motion in the joint—such, for instance, as hinges, dividers, thill-couplings, and the like.

The invention consists, mainly, in the combination of the two members to be pivoted or hinged together, each provided with cups or sockets, with balls entering the said sockets and forming a connection between the said members, one of which may turn with relation to the other upon or about the said balls, which are free to turn in any direction about their centers, so that the position of their axes with relation to the axis of rotation of the movable member may vary as the motion takes place, thus insuring a smooth and even movement and uniform wear.

The invention further consists in details of construction of the devices for adjusting the position of the bearing-surfaces with relation to one another so that the said surfaces may be adjusted or placed in contact after they have become partly worn away, thus retaining a uniform and even bearing and preventing looseness of the parts, which might otherwise cause them to produce objectionable noise, and also enabling the parts to move with a smooth and uniform friction, as is desirable in dividers or similar instruments.

Figure 1:
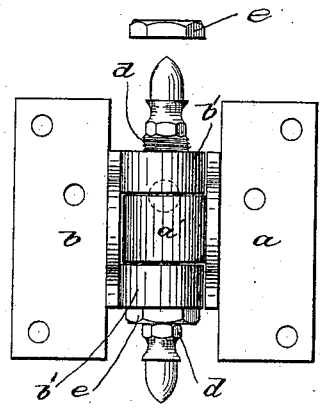
Figure 2:
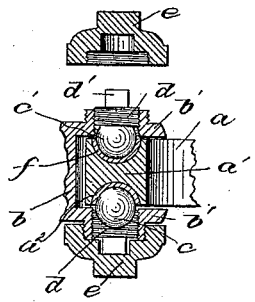

Figure 1 is a front elevation of a hinge having a joint embodying this invention, and Fig. 2 a longitudinal section through the axis of the joint, also showing a modification of the adjusting device.

The device containing the joint consists of two members, $a$ $b$, the latter of which is provided with two projections or lugs, $b'$, receiving a projection, $a'$, of the other member between them. The projection $a'$ is provided with two cup-shaped recesses, $a^2$, and the projections $b'$ are provided with corresponding cup-shaped recesses, $b^2$, (see Fig. 2,) the surfaces of the said recesses $a^2$ $b^2$ being segments of a sphere, a part of which is in each member when the two members are in proper position with relation to one another, the recesses constituting two spherical sockets which receive balls $c$ $c'$, each of which extends partly into the member $a$ and partly into the member $b$, thus retaining the said members in proper position with relation to one another, but permitting the one member to turn with relation to the other upon an axis passing through the centers of the balls $c$ $c'$.

The recesses $b^2$ in the projections $b'$ of the member $b$ are made in screws $d$, which enter threaded sockets in the projections $b'$, enabling the balls $c$ $c'$ to be introduced into the sockets or recesses of the member $a$ through the threaded passages of said screws, which are then turned into the said threaded passage until they come to a bearing on the surface of the adjacent ball $c$ or $c'$ without excessive pressure thereon. After the screws $d$ are thus properly adjusted they may be locked or prevented from turning in their threaded sockets until a new adjustment is desired, by locking devices, which, as shown in Fig. 2, consist of cap-nuts $e$, screwing upon threaded projections of the member $b$, and engaging the squared heads or ends $d'$ of the screw $d$.

The threads of the screws $d$ and nuts are preferably of opposite hand or inclination, as shown in Fig. 2, or of different pitch, so as to prevent the screw $d$ from turning with the nut by friction when the nut begins to bear upon the screw.

As shown in Fig. 1, the screws $d$ are locked by check-nuts $e$, which bear on the projections $b'$ and thus cause the threads of the screws $d$ to bind in the usual manner. As shown in Fig. 2, the recesses in the member $a$ are provided with linings $f$, which afford the wearing-surface and may be made of suitable material to operate well with the material of the balls $c$ $c'$, which are preferably of different metal or material from the parts with which they come in contact. The lining-pieces $f$ may in many cases be made of rawhide with good results.

The balls $c\ c'$ are each free to turn in any direction, and when the member $a$ is moved with relation to the member $b$ the balls may accompany either member wholly or in part, according as the friction is at any moment greater between the ball and one member than between the ball and the other member, and in the movement of the parts the balls will frequently change position so as to turn about different axes and present all portions of their surfaces in contact with the members pivotally connected by the said balls, which thus wear away uniformly and evenly.

A joint of this character is especially valuable in those devices in which it is desirable to absolutely annul the lost motion, so as to prevent noise or rattling of the parts, as in thill-couplings, or where, as in the case of dividers or similar instruments, it is necessary to have friction, by which the parts will remain in whatever position they are placed with relation to one another, but when moved should turn smoothly and evenly. For such purpose the screws $d$ may be adjusted to bear with greater or less pressure upon the balls until the desired friction is produced.

It will be seen that the balls applied as herein shown do not provide rolling friction, but constitute rounded pivots, and are superior to other pivots in that they are constantly changing their position and thus presenting new wearing-surfaces.

When the parts are worn so that the balls no longer properly fit the sockets, new and larger balls may be substituted, thus making a perfect joint with but slight expense.

I claim—

1. The two members each having a projection provided with a cup-shaped recess and a ball entering the said recesses, partly in one and partly in the other member, thereby uniting the said members and constituting a pivot upon which the one member may have a rotary movement relative to the other member, the center of said ball lying in the axis of the said rotary movement, substantially as described.

2. The two members, one provided with a projection and the other with two projections which receive that of the first member between them, the first-mentioned projection having at its ends cup-shaped recesses and the other projection being provided with screws having cup-shaped recesses, and balls placed in the sockets formed by the recesses of both projections and affording a bearing-surface upon which one member may turn with relation to the other member, substantially as described.

3. The two members, one provided with a projection and the other with two projections which receive that of the first member between them, the first-mentioned projection having at its ends cup-shaped recesses and the other projection being provided with screws having cup-shaped recesses, combined with balls entering the recesses of both members and locking devices for the recessed screws, substantially as described.

4. The two members, one provided with a projection and the other with two projections which receive that of the first member between them, the first-mentioned projection having at its ends cup-shaped recesses and the other projection being provided with screws having cup-shaped recesses, combined with balls entering the recesses of both members and locking-screws for the recessed screws having a thread of different inclination from that of the recessed screws, substantially as described.

5. The two members, one provided with a projection and the other with two projections which receive that of the first member between them, the first-mentioned projection having at its ends cup-shaped recesses and the other projection being provided with screws having cup-shaped recesses, combined with lining-pieces in the said recesses and balls entering the recesses and affording the bearing-surface upon which one member may turn with relation to the other member, substantially as described.

In testimony whereof I have signed my name to this specification in the presence of two subscribing witnesses.

SULLIVAN H. ATKINS.

Witnesses:
   JOS. P. LIVERMORE,
   W. H. SIGSTON.